March 16, 1954 R. M. RINGOEN 2,672,608
AUTOMATIC TRACKING MECHANISM
Filed Nov. 15, 1952
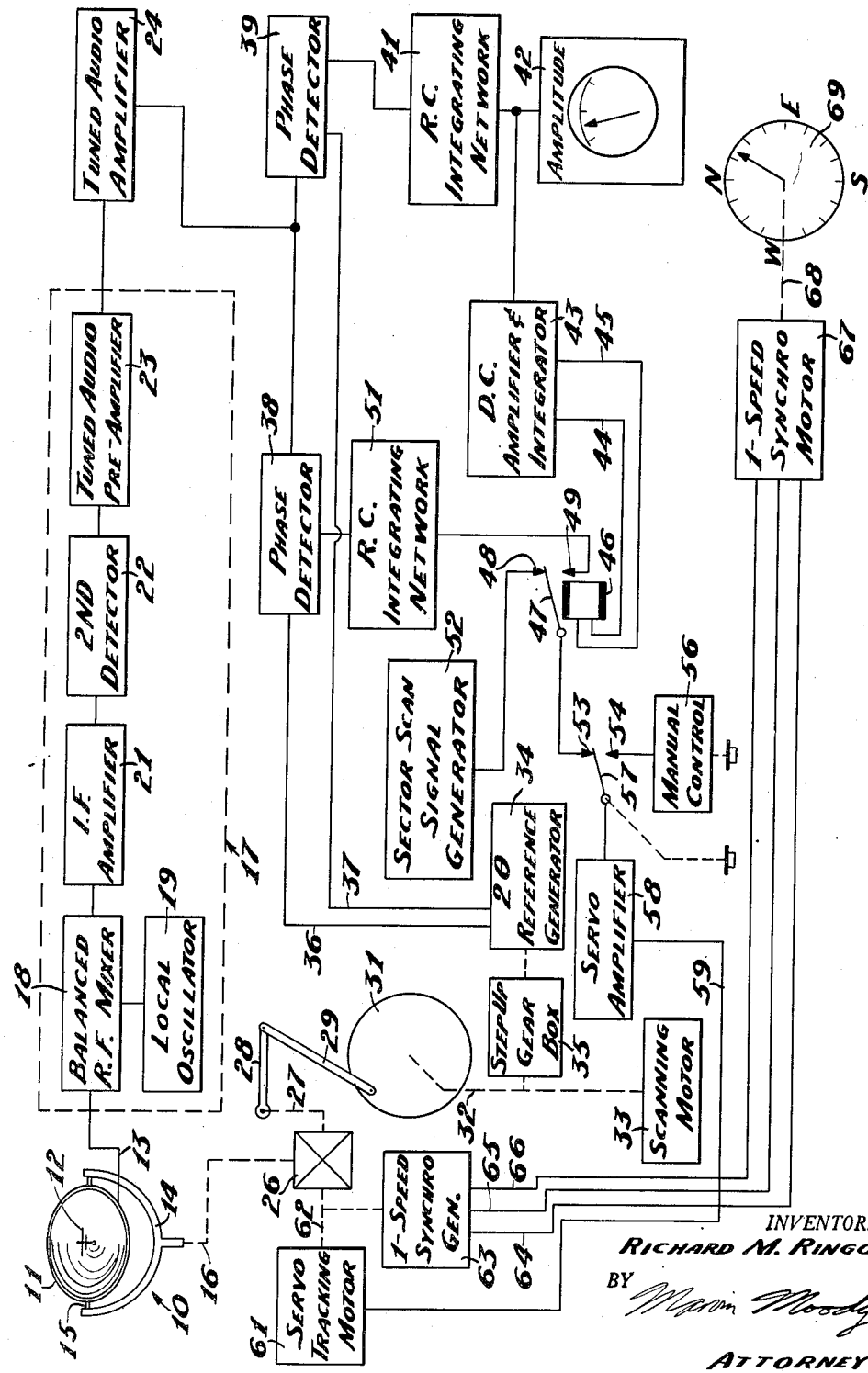
INVENTOR.
RICHARD M. RINGOEN
BY
ATTORNEY Patented Mar. 16, 1954

2,672,608

UNITED STATES PATENT OFFICE 2,672,608

AUTOMATIC TRACKING MECHANISM

Richard M. Ringoen, Cedar Rapids, Iowa, assignor to Collins Radio Company, Cedar Rapids, Iowa, a corporation of Iowa Application November 15, 1952, Serial No. 320,692

7 Claims. (Cl. 343—117)

This invention relates in general to detecting means and in particular to an automatic cloud tracker.

Conventional radiometric detection compares the antenna temperature to a phase reference temperature of approximately 325 degrees Kelvin. The antenna temperature when pointed at the atmosphere is generally between 20 and 50 degrees Kelvin, which requires that the difference between this temperature and the reference temperature be nullified in the receiving system. Another drawback of the conventional type radiometer is that it does not lend itself to automatic positioning of the antenna on the center of the cloud or other targets. To detect a cloud the antenna beam must be scanned over a wide angle and the change in output with antenna position observed. This limits the amount of integration which may be used in the output presentation.

Another disadvantage is that considerable attention must be given to the equipment by an operator. He must carefully check the tuning of the receiver and readjust the nullifying signal from time to time. Constant surveillance is required by the operator.

It is an object of this invention, therefore, to provide a radiometric tracking system which does not utilize an arbitrary thermal reference signal.

Another object of this invention is to provide an automatic tracking system which searches a relatively broad sector until a target is noted within the sector, at which time it changes to a narrow angle scanning operation.

Another object of this invention is to provide an automatic tracking device wherein the antenna is scanned over a relatively small angle.

A feature of this invention is found in the provision for a radiometric receiver which has its antenna connected to a scanning motor, which is in turn connected to a two-phase reference generator that supplies inputs to a pair of phase detectors that also receive the output of the radiometric receiver. One of the phase detectors produces an output which is proportional to the amplitude of the target radiation and the second phase detector produces an output proportional to the tracking error. A tracking motor is controlled by the tracking error signal to keep the antenna on target.

Further features, objects and advantages of this invention will become apparent from the following description and claims when read in view of the drawing in which the figure illustrates an automatic tracking mechanism according to the present invention.

An antenna is designated generally as 10 and comprises a focusing disc 11 which has a wave guide 12 mounted at its focal point and which supplies an input to a lead 13. The antenna 10 is supported on a yoke 14 which has a horizontal or elevation axis 15 and a vertical or azimuth axis 16.

The lead 13 supplies an input to a radiometric receiver designated generally as 17 and which comprises a balanced radio frequency mixer 18 that receives the incoming signal and an input from a local oscillator 19. An intermediate frequency amplifier 21 receives the output of the mixer 18 and a second detector 22 receives the output of the amplifier 21 to remove the audio signal therefrom. A tuned audio pre-amplifier 23 receives the output of the second detector to amplify it.

A second tuned audio amplifier 24 receives the output of the receiver 17 and raises it to a higher level.

The axis 16 is connected to the output shaft of a differential 26 which receives an oscillatory input from a shaft 27 that is connected to a rocker arm 28 which has its free end connected to a link 29. The opposite end of the link 29 is connected to a wheel 31 that is rotatably supported on a shaft 32. The shaft 32 is driven by a scanning motor 33.

The shaft 32 is also connected to a one to two gear box 35 which is connected to a two-phase reference generator 34 which has a pair of output leads 36 and 37, respectively, that are connected, respectively, to phase detectors 38 and 39. The phase detectors 38 and 39 also receive inputs from the tuned audio amplifier 24.

An integrating network 41 receives the output of the phase detector 39 and furnishes an output to an amplitude meter 42.

A direct current amplifier and integrator 43 also receives an input from the integrating network 41 and has output leads 44 and 45 connected to an electromagnetic relay 46 which controls the position of a switch 47 between contacts 48 and 49.

The output of the phase detector 38 is supplied to a second integrating network 51 which is electrically connected to the contact 49. A sector scan signal generator 52 is connected electrically to the contact 48 and a contact 53 is connected electrically to the switch 47. A contact 54 is mounted adjacent the contact 53 and is connected to a manual control 56.

A switch 57 is movable between the contacts 53 and 54 and is electrically connected to a servo amplifier 58 which supplies an electrical input through lead 59 to a servo tracking motor 61. The servo tracking motor 61 has an output shaft 62 which supplies an input to the differential 26 and which is also connected to a single speed synchro generator 63. The synchro generator 63 has three-phase outputs which are connected, respectively, to the leads 64, 65 and 66 that are in turn connected to a single speed synchro motor 67.

The synchro motor 67 has an output shaft 68 which is in turn connected to an azimuth indicator 69.

In operation, scanning motor 33 continually rotates at a fixed speed, as for example, 2½ revolutions per second. The gearing between the scanning motor 33 and the shaft 16 may be such that the scanning motor causes the shaft 16 to oscillate over a 15 degree sector. In the event that the antenna 10 is pointed toward a radiating body which is smaller than the angle of scan, the received signal will be modulated at a five cycle per second rate, which is two times the revolutions per second of the scanning motor 33. This is because the antenna will sweep past the target twice for each revolution of the shaft 32. The modulated input from the antenna will be fed by the lead 13 to the receiver where the audio modulation resulting from a target within the scan area will be removed and fed to the tuned audio amplifier 24.

The two-phase reference generator 34 has its armature rotated at twice the speed of the shaft 32 because of the action of the one to two gear box 35. The reference generator 34 produces a pair of sinusoidal outputs which are ninety degrees out of phase.

The lead 37 supplies one of the reference signals from the generator 34 to the phase detector 39 and when the output of the tuned audio amplifier is compared with the output arriving through the lead 37 the phase detector 39 will produce an output proportional to the amplitude of the incoming signal. For example, suppose the antenna 10 is scanning across a target which is radiating energy that is received as the antenna is scanned across the target. The amplitude of this energy will appear at the output of the amplifier 24. The phase detector 39 will produce a large output if high level energy is being received and a small output if less energy is being received.

It is to be realized that the signal received through the lead 37 is in phase with the received signal.

The integrating network 41 smooths the output of the phase detector 39 to produce a substantially direct current signal which is transmitted to the amplitude meter 42. It is calibrated so that its indicator gives a reading proportional to the amplitude of the received energy. When a signal of sufficient strength is being received by the antenna, the amplifier and integrator 43 will produce a direct current signal of sufficient strength to energize the relay 46, thus connecting the switch 47 to the contact 49.

The second phase detector 38 receives inputs from the amplifier 24 and the reference generator 34. The input furnished by lead 36 is shifted 90 degrees to the input furnished to phase detector 39 and will produce an output characteristic proportional to the error in azimuth. In other words, if the center of the antenna scan is focused on the target, the output of the phase detector 38 will be zero; whereas, if the target is to either side of the center of the antenna scan, an output signal will be obtained with the polarity indicating the direction of deviation from center.

The second integrating network 51 smooths fluctuations in the output of the phase detector 38. The output of network 51 is furnished through the contact 49, switch 47, contact 53, and switch 57 to servo amplifier 58.

The servo amplifier 58 supplies an input to the servo tracking motor 61 which controls the azimuth position of the antenna. Thus, if the output of the phase detector 38 is other than zero, it means that an error in azimuth exists and this signal will be furnished to the servo tracking motor which will vary the azimuth position until the azimuth error has been corrected.

Thus, the output shaft 62 of the servo tracking motor indicates the correct azimuth position at all times. A one-speed synchro generator 63 is connected to shaft 62 and produces three electrical outputs which are connected to a synchro motor 67 whose armature will track the armature of the synchro generator.

The output shaft 68 is connected to the armature of motor 67 and controls an azimuth indicator 69 which continuously gives an azimuth indication of the target.

The operation above described has assumed that the antenna was intercepting a target. However, at certain times no target will be intercepted by the antenna and at such times the output of the phase detector 39 will be zero which will be indicated on the amplitude meter 42 and which will cause the relay 46 to remain unenergized, causing the switch 47 to engage contact 48. This connects the sector scan signal generator 52 to the servo tracking motor 61 so that the signal produced by the generator 52 will determine the position of the antenna 10.

The sector scan signal generator 52 may be any one of a number of apparatuses. For example, it may be a sawtooth generator which produces a sawtooth wave that will cause the antenna to search over a ninety degree sector or any other angular sector which may be adjustable. It may, on the other hand, produce a constant direct current output which will cause antenna 10 to continuously rotate in one direction until a target is intercepted. Whatever the form of the signal generator 52, it will be disconnected whenever a target is intercepted which produces sufficient radiant energy to cause the output of the phase detector 39 to energize the relay 46. At that time the signal generator 52 is disconnected and the phase detector 38 takes control of the azimuth position of the antenna. The generator 52 might be a square wave generator which would cause the antenna to reverse direction every time the polarity of the pulse changed.

The manual control 56 is provided in the event that manual tracking is desired, at which time the switch 57 will be manually moved to engage contact 54. The manual control may comprise a battery or other voltage source which may be varied so as to furnish a varying control signal to the motor 61 through the servo amplifier 58.

It is seen, therefore, that this invention provides a means for continuously tracking a target or other body which is producing a radiant energy output and wherein the amplitude of the radiant energy and azimuth will be indicated. It is to be realized that scanning of the antenna over a small sector, as for example, 15 degrees, by the scanning motor 33 will not cause a fluctuation in the output of the azimuth indicator 69 due to the integration network 51. Neither will fluctuations in amplitude be indicated, due to integration by the integrating network 41.

Advantages of this system are:

1. Longer integration times in the output presentation could be used.
2. Temperature stabilization of the receiver would be eliminated.
3. The critical waveguide modulator would be eliminated.
4. Effects of a "lumpy" atmosphere absorption would be minimized along with the effects of a non-homogenous radome.
5. The output resulting from radiation from the ground would be minimized and would be reduced essentially to zero for a level horizon.
6. No nullifying voltages would have to be used.
7. The antenna could be made to automatically track the cloud.
8. The equipment could operate unattended.

Although this invention has been described with respect to particular embodiments thereof, it is not to be so limited as changes and modifications may be made therein which are within the full intended scope of the invention as defined by the appended claims.

I claim:

1. An automatic tracking means comprising, an antenna mounted on horizontal and vertical shafts, a radiometric receiver receiving the output of said antenna, a differential connected to one of the antenna's shafts, an oscillatory shaft connected to said differential, a rocker arm attached to said oscillatory shaft, a wheel supported for rotary motion, a link connected to said wheel adjacent the periphery and to said rocker arm, a scanning motor connected to said wheel to rotate it, a pair of phase detectors receiving the output of said radiometric receiver, a two-phase generator producing outputs ninety degrees out of phase supplying inputs to said first and second phase detectors, a one to two step-up gear box connected to said scanning motor and to said two-phase generator, an amplitude indicator connected to the first phase detector, a servo tracking motor supplying a shaft input to said differential and receiving an input from said second phase detector.

2. An automatic tracking mechanism comprising, an antenna mounted on a control axis, a radiometric receiver connected electrically to said antenna, a differential connected to said control shaft, a scanning motor coupled to said differential and providing an oscillatory shaft input, a tracking motor coupled to said differential, a two-phase reference generator connected to said scanning motor, a pair of phase detectors receiving inputs respectively from said two-phase reference generator, said radiometric receiver supplying inputs to the first and second phase detectors, an amplitude indicating means connected to the output of the first phase detector, and said servo tracking motor connected to the output of the second phase detector.

3. An automatic tracking mechanism comprising, a radiometric antenna mounted on a control axis, a radiometric receiver receiving electrical input from said radiometric antenna, a mechanical differential connected to said control axis, a servo tracking motor supplying a shaft input to said differential, a scanning motor, a wheel rotatably connected to said scanning motor, a link pivotally connected to the periphery of said wheel, a support shaft, a rocker arm rotatably supported on said support shaft and its free end pivotally connected to said link, said support shaft supplying an oscillatory input to said differential, a one to two step-up gear box connected to said scanning motor, a two-phase reference generator connected to the output shaft of said step-up gear box and producing a pair of outputs which are separated in phase by ninety degrees, a pair of phase detectors receiving inputs from said radiometric receiver, the first and second phase detectors receiving, respectively, the first and second phases of said reference generator, an amplitude indicator connected to the first phase detector and the servo tracking motor connected electrically to the output of the second phase detector.

4. An automatic tracking mechanism comprising, an antenna supported on a control shaft, a radiometric receiver receiving an electrical input from said antenna, a pair of phase detectors receiving the output of said radiometric receiver, a differential connected to said control shaft, a tracking motor supplying a shaft input to said differential, a rotary to oscillatory motion conversion unit supplying an input to said differential, a scanning motor connected to said conversion unit, a step-up gear box connected to said scanning motor, a two-phase reference generator connected to the gear box, said pair of phase detectors receiving inputs from said two-phase reference generator, a first integrating network receiving the output of one of the phase detectors, an amplitude meter receiving the output of said first integrating network, a relay connected to said first integrating network, a second integrating network connected to the other phase detector, and said second integrating network connected electrically to the servo tracking motor when the relay is energized.

5. An automatic tracking mechanism comprising, an antenna supported on a control shaft, a radiometric receiver receiving an electrical input from said antenna, a pair of phase detectors receiving the output of said radiometric receiver, a differential connected to said control shaft, a tracking motor supplying a shaft input to said differential, a rotary to oscillatory motion conversion unit supplying an input to said differential, a scanning motor connected to said conversion unit, a step-up gear box connected to said scanning motor, a two-phase reference generator connected to the gear box, said pair of phase detectors receiving inputs from said two-phase reference generator, a first integrating network receiving the output of one of the phase detectors, an amplitude meter receiving the output of said first integrating network, a relay connected to said first integrating network, a second integrating network connected to the other phase detector, a sector scan signal generator connected to a first contact of said relay, a second contact of said relay connected to said second integrating network, and a movable contact movable between the first and second contacts and electrically connected to said servo tracking motor.

6. An automatic tracking mechanism comprising, an antenna supported on a control shaft, a radiometric receiver receiving an electrical input from said antenna, a pair of phase detectors receiving the output of said radiometric receiver, a differential connected to said control shaft, a tracking motor supplying a shaft input to said differential, a rotary to oscillatory motion conversion unit supplying an input to said differential, a scanning motor connected to said conversion unit, a step-up gear box connected to said scanning motor, a two-phase reference generator connected to the gear box, said pair of phase detectors receiving inputs from said two-phase reference generator, a first integrating network receiving the output of one of the phase detectors, an amplitude meter receiving the output of said first integrating network, a relay connected to said first integrating network, a second integrating network connected to the other phase detector, a sector scan signal generator connected to a first contact of said relay, a second contact of said relay connected to said second integrating network, a movable contact movable between the first and second contacts and electrically connected to said servo tracking motor, and means for indicating the shaft position of said servo tracking motor to give an azimuth indication.

7. An automatic tracking mechanism comprising, an antenna supported on a control shaft, a radiometric receiver receiving an electrical input from said antenna, a pair of phase detectors receiving the output of said radiometric receiver, a differential connected to said control shaft, a tracking motor supplying a shaft input to said differential, a rotary to oscillatory motion conversion unit supplying an input to said differential, a scanning motor connected to said conversion unit, a step-up gear box connected to said scanning motor, a two-phase reference generator connected to the gear box, said pair of phase detectors receiving inputs from said two-phase reference generator, a first integrating network receiving the output of one of the phase detectors, an amplitude meter receiving the output of said first integrating network, a relay connected to said first integrating network, a second integrating network connected to the other phase detector, a sector scan signal generator connected to the first contact of said relay, a second contact of said relay connected to said second integrating network, a first movable contact movable between the first and second contacts, a second switch comprising, third and fourth contacts and a second movable contact, the third contact connectable with the first movable contact, a manual control connected to the fourth contact, and said second movable contact connected to said second servo tracking motor.

RICHARD M. RINGOEN.

References Cited in the file of this patent

UNITED STATES PATENTS

| Number | Name | Date |
| --- | --- | --- |
| 2,412,612 | Godet | Dec. 17, 1946 |
| 2,446,024 | Porter et al. | July 27, 1948 |
| 2,448,007 | Ayres | Aug. 31, 1948 |